Sept. 9, 1958
J. R. PALMER
2,851,651
POLYPHASE RECTIFIER STARTING METHOD AND APPARATUS
Filed June 10, 1954
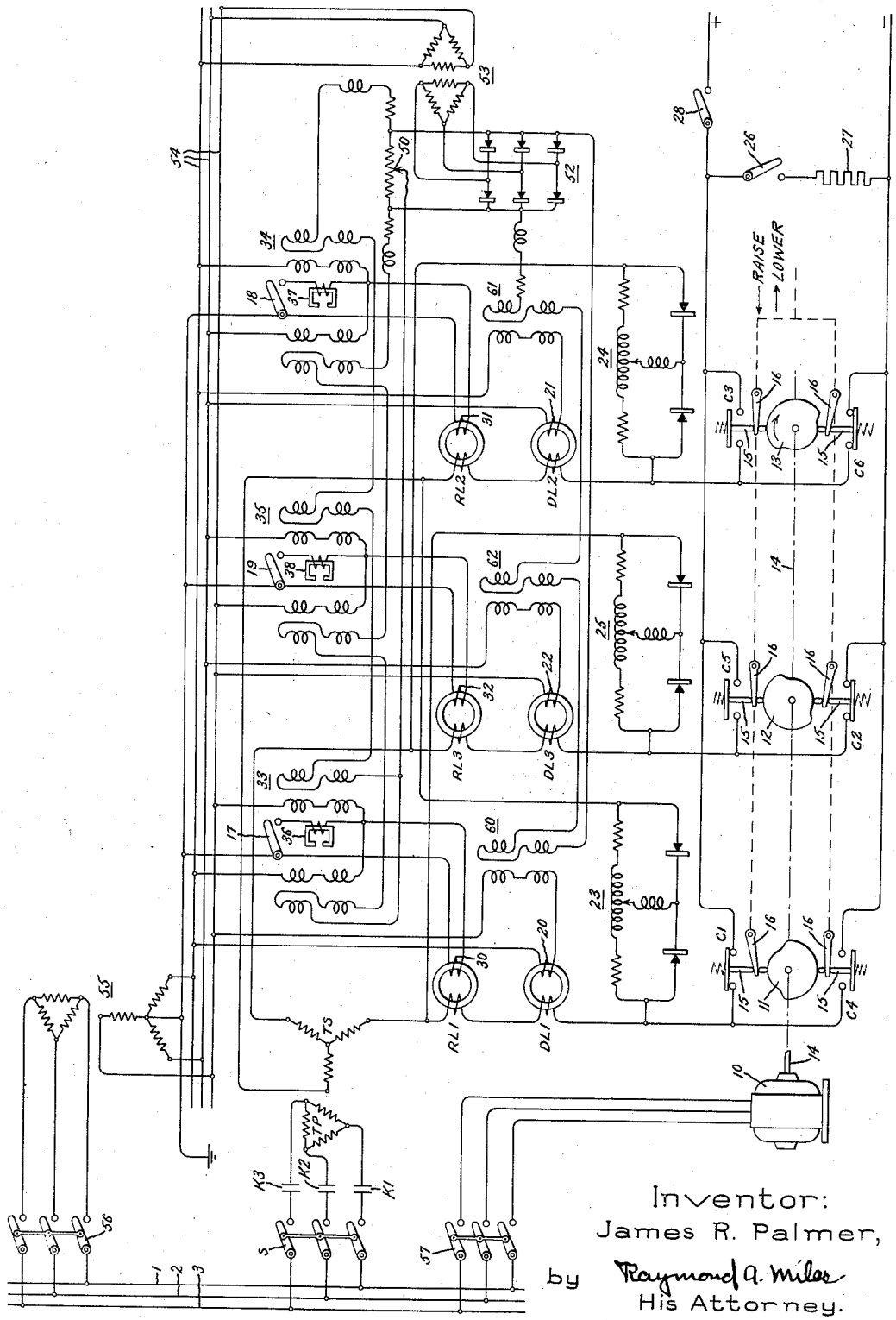
Inventor:
James R. Palmer,
by Raymond A. Miles
His Attorney.

United States Patent Office 2,851,651
Patented Sept. 9, 1958

2,851,651

POLYPHASE RECTIFIER STARTING METHOD
AND APPARATUS

James R. Palmer, State College, Pa., assignor to General
Electric Company, a corporation of New York Application June 10, 1954, Serial No. 435,808

7 Claims. (Cl. 321—48)

The invention relates to starting methods and apparatus for polyphase alternating current rectifiers, particularly of the mechanical or commutating contact type.

The principal object is to provide improved methods and apparatus for enabling the co-operating current controlling and commutating elements of a mechanical contact rectifier to be progressively started into operation so as to minimize contact sparking or other transient current and voltage disturbances that might result in an arc back.

The current commutating elements of a mechanical contact rectifier consist essentially of synchronously operated successive circuit closing and opening contacts having a normal closure overlap that enable the successive alternating current phase circuits energizing the rectifier to continuously supply tthe load current during the successive and overlapping closure periods of the corresponding contacts. The overlapping closure of the contacts enables the load current to be transferred or commutated from each preceding phase circuit to the succeeding phase circuit.

The co-operating current controlling elements are reactors that are saturable at very low current values relative to the load current and connected in series with the load current conducting and commutating contacts. Such saturable reactors may serve for limiting the current to be interrupted by unsaturation of the reactors during a limited interval including the instant the contacts open and also if desired for delaying the start of current flow by saturation of the reactors for a limited interval after the contacts close so as thereby to limit the output voltage of the rectifier. The load current saturable reactors ordinarily have magnetization biasing windings variably energized so as to co-operate with the transfer of load current during the contact overlap periods in controlling either the unsaturation thereof for commutating or saturation thereof for output voltage control purposes or both. Thus, by means of such biasing windings, the voltage control reactors may be made variably effective at the beginning of the contact overlap periods to delay the build-up of current in the incoming phase and thereby reduce the output voltage of the rectifier while the commutating reactors are made effective to suppress sparking at the end of the contact overlap periods.

When such a contact rectifier is once in operation under normal load, all the reactors are saturable by the load current and will automatically be forced synchronously through their hysteresis loops so as to perform their intended functions at the proper times, but considerable difficulty may be encountered in getting the mechanical rectifier started into operation to initially supply load current without producing excessive current or voltage transients or phase disturbances that might result in destructive contact sparking or even arc backs.

Thus, a further object is to provide an improved saturable reactor preconditioning method and apparatus capable of producing synchronous reversal in the saturation of the reactors prior to the application of any load to the rectifier current conducting and commutating contacts and thereby place the saturable reactors in operative condition to function properly so as to avoid contact sparking when the load current is commutated during the overlap of the contacts.

The improved method and apparatus of the present invention are particularly suitable for starting operation of contact rectifiers provided with the improved type of synchronous contact operating mechanism having means for adjusting the dwell and consequently adjusting the overlap periods of the contacts while in operation as described and claimed in Patent 2,713,095, issued to H. P. Fullerton on July 12, 1955, and also embodying the current and voltage control improvements described and claimed in the copending application of Bedford and Kuenning, Serial No. 424,088, filed April 14, 1954, and assigned to the assignee of the present invention.

A specific object of the invention is to provide an improved method and apparatus whereby the adjustable dwell and hence adjustable overlap contact mechanism and the current and voltage control elements of the rectifier apparatus disclosed in the above-mentioned copending applications can be adapted for starting the mechanical contact rectifier into operation with no distress whatsoever at the contacts.

In carrying out the present invention in starting the rectifier having such adjustable dwell and consequently contact overlap adjusting mechanism and having load current saturable commutating reactors in circuit with the contacts, the rectifier contacts are initially energized from the polyphase alternating current circuits while the dwell and particularly the overlap period thereof is adjusted to zero. Under these conditions, in accordance with the present invention, the saturable commutating reactors must be interconnected so as to be energized from the polyphase source in delta when the contacts are energized and thereby synchronously forced through their hysteresis loops entirely independently of the overlap of the rectifier contacts. This may be accomplished by means of the improved 2-way limited current conducting means provided for diverting current from the contacts as disclosed in the above identified Bedford and Kuenning copending application. Thus, with the rectifier contacts energized from the alternating current source while the dwell and particularly the overlap period thereof is zero, the limited current conducting means interconnected between successive contacts will serve to interconnect all the saturable reactors in a delta circuit and conduct sufficient current from the alternating current source to produce synchronous reversal of the saturation of the reactors entirely independently of the contacts. Thereupon, the dwell and also the overlap of the contacts may gradually be increased from zero to normal. While the dwell of the energized contacts is being increased from zero, there is no path for current to flow through them until the dwell is increased to the point where the overlap occurs of successive contacts connected to the same direct current bus. While the dwell is being further increased to thereby increase the contact overlap from zero to normal, and also when the direct current load is applied to the contacts after the contact dwell and consequently the overlap thereof is normal, the commutating reactors will be effective at all times to insure proper limitation of the current to a negligible value at the time of opening of each contact to end the overlap period thereof with the succeeding contact.

In case a separate voltage control or retard reactor is employed for controlling the D. C. voltage output of the rectifier and provided with a parallel connected shunt reactor in order to decrease the slope of the magnetization curve as described and claimed in the above identified Bedford and Kuenning copending application, then in further accordance with the present invention, a disconnecting switch is provided whereby the sloping reactor is always disconnected at the time of starting the mechanical rectifier into operation. This will result in a reduction of the current magnitude required to saturate the retard reactor to substantially the same value as the saturating current value of the commutating reactor. Hence, the current flow through the 2-way limited current circuit means interconnected between successive contacts will be able to carry both the commutating reactor and the retard reactor in series therewith through their respective hysteresis loops synchronously, while the dwell and also the overlap of the energized rectifier contacts is zero. Then after the contact dwell and overlap are both increased from zero to normal, in further accordance with the present invention, a light direct current load is applied to the rectifier contacts. Thereupon, the sloping reactors are reconnected in parallel with the retard reactors since the light load is of sufficient value to provide synchronous reversals of the saturation of the combined retard and sloping reactors. In this way, the contact rectifier is fully prepared for application of the normal direct current load.

Further objects and advantages of the present invention may be better understood from the following description taken in connection with the accompanying drawing in which the single figure is a schematic circuit diagram of one form of contact rectifier mechanism to which the improved starting method and apparatus of the present invention may be applied.

As shown schematically in the drawing, the mechanical rectifier is provided with the improved current and voltage control elements described and claimed in the previously mentioned Bedford and Kuenning application. Also, the contacts of the rectifier are shown schematically as provided with an improved adjustable dwell and hence adjustable overlap contact operating mechanism of the adjustable wedge type such as described and claimed in the previously mentioned Fullerton application.

Energy is transmitted from the 3-phase alternating current power supply lines 1, 2, and 3 through a suitable disconnect switch or circuit breaker S, the commutating voltage supply series capacitors K1, K2, and K3, the delta-connected transformer primary windings TP, the Y-connected transformer secondary windings TS, the load voltage control or retard reactors RL1, , RL2, and RL3, the commutating or drag out reactors DL1, DL2, and DL3, and the series of synchronously closing and opening rectifier contacts C1, C5, C3 and C4, C2, C6, to the variable direct current load circuit indicated as plus and minus. The rectifier contacts are periodically closed and opened in synchronism with the polyphase voltages of supply lines 1, 2, and 3, by means of the synchronous motor 10 that is energized preferably through a step-down transformer (not shown) and switch 57 from the alternating current supply lines 1, 2, 3. The motor 10 drives suitable contact operating mechanism indicated schematically as the equiangularly displaced cams 11, 12, 13, on the shaft 14. The reciprocating push rods 15 cooperate with the cams so as to overlap the closing and opening of the contacts C1 to C6. The adjustable wedge members 16 cooperate with the push rods 15 to provide contact conduction and overlap periods that may be adjusted by the joint movement of the wedges 16. In this way the dwell and consequently the overlap periods of the rectifier contacts C1 to C6 may be varied between zero and a normal value suitable for operation of the rectifier under full load current.

The commutating reactors DL1, DL2, DL3 are provided respectively with the magnetization biasing windings 20, 21, and 22 that are energized from the secondary of transformer 55 with square wave current under the control of the saturable reactor type square wave geneators 60, 61, and 62 having direct current biasing windings energized by means of the rectifiers 52 from the secondaries of transformer 53 in the manner more fully set forth in the previously mentioned Bedford and Kuenning application. Likewise, the voltage control or retard reactors RL1, RL2, RL3 are provided respectively with the magnetization biasing windings 30, 31, and 32 which are energized from lines 54 with variable square wave current produced by the saturable reactor type dual square wave generators 33, 34, and 35 having their output voltage controlled by adjustment of the potentiometer contact 50 in the manner more fully explained in the previously mentioned Bedford and Kuenning application.

Each of the voltage control or retard saturable reactors RL1, RL2, RL3 is provided with a corresponding one of the nonsaturable shunt reactors 36, 37, and 38 for decreasing the slope and increasing the magnetizing current thereof relative to the magnetizing current of the commutating reactors DL1, DL2, DL3, as more fully explained in the aforesaid Bedford and Kuenning application.

It will be observed that the current limited circuits 23, 24, and 25 serve to interconnect the saturable reactors RL1 and DL1, the saturable reactors RL2 and DL2, and the saturable reactors RL3 and DL3 to be energized in delta from the transformer secondary TS. As pointed out more fully hereafter, such delta circuit connection of the current limit circuits 23, 24, and 25 is utilized for forcing the saturable reactors through their hysteresis loops independently of the contacts when the rectifier is started into operation in accordance with the present invention.

In order to start the mechanical rectifier shown into operation, the contact dwell adjusting wedges 16 are first operated jointly in the direction indicated by the Raise arrow so as to raise all of the contacts sufficiently to reduce the dwell and consequently the overlap thereof to zero. This enables the motor 10 to be energized by closure switch 57 to synchronously operate the cams 11, 12, and 13 without producing closure of any contacts.

In further preparation for starting the mechanical rectifier into operation, the shunt nonsaturable sloping reactors 36, 37, and 38 are disconnected by operation of the disconnection switches 17, 18, and 19 and the potentiometer contact 50 is adjusted to provide the maximum zero voltage step when switch 56 is closed to energize transformer 55. This results in energizing the control power lines 54 as well as transformer 53 and the set of 3-phase rectifiers 52. As a result potentiometer 50 is energized and all of the saturable reactors are energized with proper square wave magnetization biasing current. Consequently, when switch S is closed and the polyphase alternating voltage is applied to energize the contacts C1 to C6 through transformer windings TP and TS, the retard reactors RL1, RL2, and RL3 and also the commutating reactors DL1, DL2, and DL3 will be synchronously forced through their hysteresis loops while the dwell as well as the overlap of the contacts C1 to C6 is zero. This result can be accomplished by the limited current conducted through the current limiting circuits 23, 24, and 25 that interconnect all of the saturable reactors to be energized in delta in the manner previously described.

The contact dwell control wedges 15 now may be gradually withdrawn jointly in the opposite direction as indicated by the Lower arrow to increase the dwell as well as the overlap periods of the contacts C1 to C6 from zero to normal. Even such a gradual increase of the contact overlap may be accomplished without any significant sparking being produced at the contacts. This is due to the fact that the combined volt seconds of the retard reactors RL1, RL2, and RL3 and the commutating reactors DL1, DL2, and DL3 are effective to limit the current when the contacts open to end each overlap period. This will avoid contact sparking even with no load current being supplied by the rectifier. Under these conditions the switch 26 may be closed to connect the light-load resistor 27 to be supplied with current through the rectifier contacts while the dwell and the overlap periods thereof are normal. The resulting current supplied to the light-load resistor 27 is now sufficient to force the retard reactors RL1, RL2, RL3 through their hysteresis loops even with the nonsaturable sloping reactors 36, 37, and 38 connected in shunt therewith. Consequently, the switches 17, 18, and 19 may now be closed to place the mechanical rectifier in full operating condition ready for application of the normal load current upon closure of the direct current load switch 28. The resulting application of full load current to the rectifier contacts can be accomplished without any contact distress since all of the saturable reactors are now in full normal operating condition. After full load current is applied the switch 26 may be open to disconnect the light-load resistor 27.

In stopping the operation of the rectifier the reverse sequence of the various operations specified above is desirable in order to avoid contact sparking or other transient disturbances.

What I claim as new and desire to secure by Letters Patent of the United States is:

1. The method of starting an adjustable overlap contact rectifier having load current saturable commutating reactors comprising energizing the rectifier contacts from a polyphase alternating current source, synchronously operating the reactors through their hysteresis loops while the contacts are energized and their overlap is zero, increasing the overlap of the energized contacts from zero to normal, and applying load current to the rectifier contacts after their overlap is normal.

2. The method of starting operation of a polyphase synchronously overlapping adjustable overlap contact rectifier having a load current saturable commutating reactor in series in each contact energizing circuit comprising energizing the rectifier contacts, synchronously reversing the saturation of the reactors while the contacts are energized and their overlap is zero, gradually increasing the overlap of the energized contacts from zero to normal and applying a direct current load to the contacts after their overlap is normal.

3. The method of starting the operation of a polyphase alternating current rectifier having synchronously operated overlapping contacts and limited 2-way current conducting means interconnected between successive contacts and mechanism for adjusting the overlap of each contact between zero and normal and having load current saturable commutating reactors in series with the contacts comprising energizing the contacts from a polyphase alternating current source with the overlap of the contacts adjusted to zero to force the commutating reactors through their hysteresis loops by the current conducted through the limited 2-way current conducting means connected between successive contacts, increasing the contact overlap from zero to normal, and connecting a load to the contacts after their overlap is normal.

4. The method of starting the operation of a polyphase mechanical rectifier having synchronously overlapping contacts and limited current conducting means connected between successive contacts and having synchronous mechanism for operating the contacts provided with means for simultaneously adjusting the overlap of each contact between zero and normal and having load current saturable reactors in series with the contacts and provided with a shunt nonsaturable sloping reactor comprising energizing the contacts from an alternating current source with the overlap of the contacts adjusted to zero, synchronously operating the contacts while each sloping reactor is disconnected to saturate the saturable reactors through the limited current conducting means connected between successive contacts, increasing the contacts overlap from zero to normal, connecting a light load across the rectified current terminals of the contacts and reconnecting the sloping reactors.

5. In combination, a mechanical contact rectifier having parallel connected saturable and nonsaturable reactors in series with the contacts, a light-load resistor, first switching means operable to connect said resistor to the rectifier, and second switching means for disconnecting the nonsaturable reactors during the starting of the rectifier and for reconnecting the nonsaturable reactors after operation of said first switching means.

6. In a mechanical contact rectifier having load current conducting synchronously overlapping contacts energizable from a polyphase alternating current circuit, an adjustable operating mechanism for adjusting the overlap of each contact from zero to normal in starting the rectifier into operation, a plurality of saturable reactors, each having a magnetizing winding connected in the energizing circuit of a corresponding contact, and limited current conducting means interconnecting the reactor magnetizing windings in a delta circuit bypassing the contacts for synchronously forcing the saturable reactors through their hysteresis loops by the limited current conducted therethrough while the contact overlap is increased from zero to normal.

7. A mechanical contact rectifier having load current conducting successively overlapping contacts energizable from a polyphase alternating current source and provided with synchronous operating mechanism having means for adjusting the overlap of successive contacts from zero to normal in starting the rectifier into operation, a plurality of load current saturable reactors, each connected in series with the energizing circuit of a corresponding contact and having a shunt nonsaturable sloping reactor provided with means for disconnecting the sloping reactor in starting the rectifier into operation, and limited current conducting means interconnecting the reactors in a delta circuit bypassing the contacts for forcing the saturable reactors through their hysteresis loops by means of the limited current conducted therethrough while the contact overlap is increased from zero to normal.

References Cited in the file of this patent

UNITED STATES PATENTS

| | | |
|---|---|---|
| 1,184,266 | Schweitzer | May 23, 1916 |
| 2,036,708 | Logan | Apr. 7, 1936 |
| 2,440,984 | Summers | May 4, 1948 |
| 2,782,359 | Koppelmann | Feb. 19, 1957 |

FOREIGN PATENTS

| | | |
|---|---|---|
| 1,044,881 | France | Nov. 23, 1953 |